(12) United States Patent
Alm et al.

(10) Patent No.: US 6,454,269 B2
(45) Date of Patent: Sep. 24, 2002

(54) MECHANICAL DEVICE WITH SEALING MEANS AND METHOD FOR MOUNTING THE SEALING MEANS

(75) Inventors: Filip Alm, Bohus; Per-Ove Josefsson, Vanersborg, both of (SE)

(73) Assignee: Parker Hannifin AB, Boras (SE)

( * ) Notice: Subject to any disclaimer, the term of this patent is extended or adjusted under 35 U.S.C. 154(b) by 0 days.

(21) Appl. No.: 09/862,046

(22) Filed: May 21, 2001

Related U.S. Application Data

(63) Continuation of application No. PCT/SE99/02211, filed on Nov. 26, 1999.

(30) Foreign Application Priority Data

Nov. 27, 1998 (SE) .............................................. 9804087

(51) Int. Cl.[7] ................................................ F16J 15/34
(52) U.S. Cl. ...................................... 277/370; 277/551
(58) Field of Search ................................ 277/370, 380, 277/549, 569, 551, 571, 572, 371, 375

(56) References Cited

U.S. PATENT DOCUMENTS 5,186,472 A * 2/1993 Romero et al.
6,302,404 B1 * 10/2001 Bundgart

FOREIGN PATENT DOCUMENTS

| DE | 4018796 | 1/1992 |
|----|---------|--------|
| GB | 2 137 702 | 10/1984 |

* cited by examiner

Primary Examiner—Robert J. Sandy
Assistant Examiner—Karlena D. Schwing
(74) Attorney, Agent, or Firm—Christopher J. Hunter

(57) ABSTRACT

A mechanical device having a shaft, a sealing device for sealing around the shaft, a housing, and a first abutment means. The sealing device has a carrier means on which a plurality of resilient sealing elements are arranged. The mechanical device further has an enclosure means. The sealing device has a first sealing element with an inner dimension, which is larger than the outer dimension of the shaft. The enclosure means at least partially encloses the first sealing element. After the sealing means has been mounted and compressingly fastened in the mechanical device, the first sealing element is compressed in a first direction (A), axially along the shaft and expanded in a second direction (B), radially towards the shaft. The first sealing element is thus brought to a sealing engagement with the shaft.

17 Claims, 2 Drawing Sheets

MECHANICAL DEVICE WITH SEALING MEANS AND METHOD FOR MOUNTING THE SEALING MEANS

CROSS REFERENCE TO RELATED APPLICATIONS

This application is a continuation of copending International Application No. PCT/SE99/02211 filed Nov. 26, 1999, which designated the United States, claims priority to Swedish Patent Application 9804087-6, filed Nov. 27, 1998, and originally published in English is incorporated herein by reference.

BACKGROUND OF THE INVENTION

The present invention relates to a mechanical device having a sealing means and a method of mounting the sealing means to the mechanical device.

Different types of sealing means for mechanical devices are known. Special sealing means are required when sealing a rotating shaft from its housing, i.e, from the non-rotating surrounding parts of the mechanical device. In GB-A-2 137 702, an oil sealing means is shown which, on the one hand, is arranged to seal against the surface of a rotating shaft and, on the other hand, is arranged to seal against the non-rotating housing. A cylindrical elastomeric sleeve is adapted to be received over the outside diameter of the shaft, to seal against the shaft. A further traditional sealing means seals against the housing. The sleeve has to be pressed on the shaft, because of the tight fit required between the sleeve and the shaft. The sealing material of the sleeve is therefore easily cut or otherwise damaged during this operation, especially if the shaft is provided with sharp cornered splines, of the same diameter as the shaft, at the outgoing end of the shaft.

SUMMARY OF THE INVENTION

The object of the present invention is to provide a mechanical device, which has an easy-to-mount sealing means.

A further object of the invention is to provide a mechanical device, which has a more effective sealing means.

These objects are achieved with a mechanical device which includes a shaft, a sealing device for sealing around the shaft, a housing, and a first abutment means; where the sealing device comprises carrier means on which a plurality of sealing elements are arranged. The mechanical device further includes an enclosure means, and the sealing device further comprises a first sealing element having an inner dimension which is larger than the outer dimension of the shaft. The enclosure means at least partially encloses the first sealing element, so that after the sealing means has been mounted and compressingly fastened in the mechanical device, the first sealing element is compressed in a first direction (A) axially along the shaft and expanded in a second direction (B) radially towards the shaft, so that a first contact surface of the first sealing element is in contact with the first abutment means and a second contact surface of the first sealing element is in sealing engagement with the shaft.

A further object of the invention is to provide a method of mounting the sealing means according to the invention to a mechanical device.

This object is achieved with a method of mounting the sealing means to the mechanical device including:

i) arranging the first abutment means on the shaft;
ii) arranging the first sealing element, and the first carrier means and the second carrier means, over the shaft;
iii) arranging the second abutment means onto the shaft;
iv) fastening the sealing means in the mechanical device, by compressing the second abutment means towards the first abutment means, thus compressing the first sealing element in the first direction (A), axially along the shaft, and expanding the first sealing element in the second direction (B), radially towards the shaft, thus bringing a first contact surface of the first sealing element in contact with the first abutment means and a second contact surface of the first sealing element in sealing engagement with the shaft; and
v) fastening the second abutment means on the shaft.

This object is also achieved with a method of mounting the sealing means to the mechanical device by:

i) arranging the first abutment means onto the shaft;
ii) arranging the first carrier part onto the shaft;
iii) arranging the second carrier part on the first carrier part;
iv) arranging the second abutment means onto the shaft;
v) fastening the sealing means in the mechanical device by compressing the second abutment means towards the first abutment means, thus compressing the first sealing element in the first direction (A), axially along the shaft and expanding the first sealing element in the second direction (B), radially towards the shaft, thus bringing a first contact surface of the first sealing element in contact with the first abutment means and a second contact surface of the first sealing element in sealing engagement with the shaft; and
vi) fastening the second abutment means on the shaft.

Further preferred embodiments are disclosed in the appended dependent claims.

DETAILED DESCRIPTION OF THE PREFERRED EMBODIMENT

Figure 1:
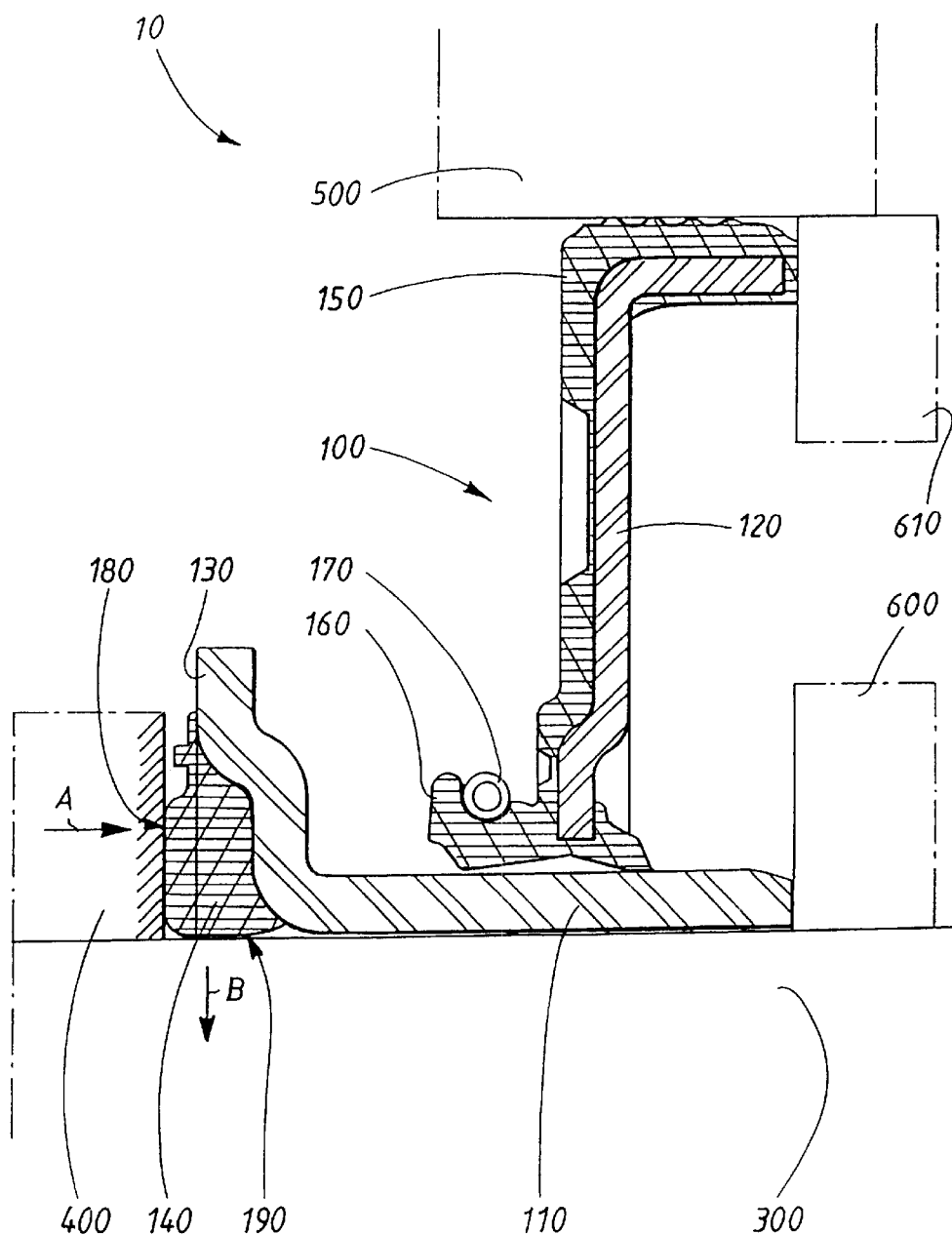
FIG. 1 is a schematic sectional side view of one part of a sealing means used with a mechanical device according to a first embodiment of the invention.

A mechanical device 10 according to the invention is shown in FIG. 1. The device 10 comprises a housing 500 and a shaft 300. The shaft 300 is rotatably arranged in the housing 500 and is advantageously provided with splines (not shown) for enhanced engagement with drive units (not shown) or the like.

The device 10 further comprises a sealing device 100 for sealing around the shaft 300 and against the housing 500. A first abutment means 400 is provided in the mechanical device 10 to function as a stop/anvil for the sealing device 100.

The sealing device 100 comprises a first carrier part 110 and a second carrier part 120 on which a plurality of sealing elements 140, 150, 160 are arranged. A first sealing element 140 is arranged on the first carrier part 110, to seal against the shaft 300. The sealing surface of the first sealing element 140 may be smooth or patterned, e.g. ribbed, and the material used is preferably a resilient material. A second sealing element 150 is arranged on the second carrier part 120, to seal against the housing 500. The second carrier part 120 further has a third sealing element 160, which is arranged to seal between the first carrier part 110 and the second carrier part 120. The third sealing element 160 is advantageously held in sealing engagement by a spring means 170, e.g. a garter spring.

Thus, the first carrier part 110 is arranged to rotate with the shaft 300 whilst the second carrier part 120 is arranged to be held still with respect to the housing 500.

The splines of the shaft 300 are generally formed having sharp edges, which could easily cut the first sealing element 140 during mounting of the sealing device 100 on the shaft 300. For that reason, the first sealing element 140 has an inner dimension, which is larger than the outer dimension of the shaft 300. Thus, the first sealing element 140, and the sealing device 100, may be mounted over the shaft 300 without risking cutting the first sealing element on the sharp splines.

The mechanical device 10 further comprises a first enclosure means 130, which at least partially encloses the first sealing element 140. When the sealing device 100 is mounted and compressingly fastened in the mechanical device 10, the first sealing element 140 is compressed in a first direction "A", axially along the shaft 300, and expanded in a second direction "B", radially towards the shaft. Thus, a first contact surface 180 of the first sealing element 140 is in contact with the first abutment means 400 and a second contact surface 190 of the first sealing element 140 is in sealing engagement with the shaft 300. It is possible, but not necessary, to arrange a sealing engagement also between the first contact surface 180 and the first abutment means 400.

In this way, the first sealing element 140 is forced into a sealing engagement with the shaft 300 when mounted in the mechanical device 10. The expansion of the first sealing element 140 in the second direction "B" is greatly enhanced by the first enclosure means 130 because the first enclosure means prevents the expansion of the first sealing means 140 in directions opposite to the first direction A and the second direction B.

The first enclosure means 130 is arranged on the first carrier part 10, according to the embodiment shown in FIG. 1.

The first carrier part 110 is prevented from sliding along the shaft 300 in the first direction A by a second abutment means 600. Thus, the second abutment means 600 holds and compressingly fastens the sealing means 100 in the mechanical device 10. Similarly, the second carrier part 120 is prevented from sliding along the shaft 300 in the first direction A by a third abutment means 610.

Figure 2:
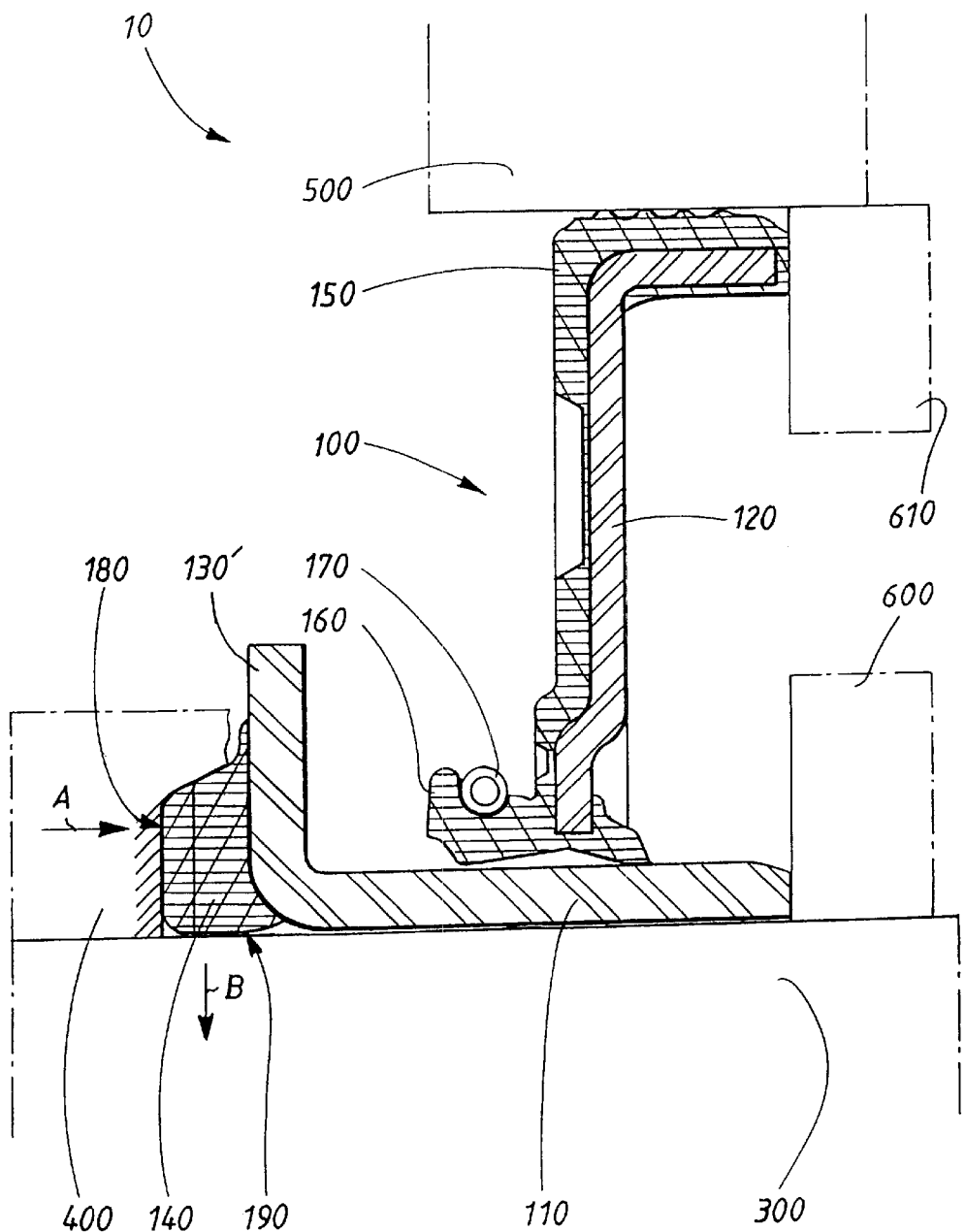
FIG. 2 is a schematic sectional side view of one part of a sealing means used with a mechanical device according to a second embodiment of the invention.

Another embodiment of a mechanical device 10 according to the invention is shown in FIG. 2. A second enclosure means 130' is, in this embodiment, arranged on the first abutment means 400. The functioning of the second enclosure means 130' is similar to what has been described regarding the first enclosure means 130 according to FIG. 1. No enclosure means is thus present on the first carrier part 110 according to this embodiment. All other features are similar to the embodiment described with reference to FIG. 1.

According to one preferred embodiment of the invention, the first abutment means 400, the second abutment means 600 and the third abutment means 610 are bearing elements, e.g. ball or roller bearings journalling the shaft 300. Alternatively, the first abutment means 400 may be an enlarged diameter part of the shaft 300, and may thus be integrally formed with the shaft.

A first method of mounting the sealing device 100 in a mechanical device 10 according to the invention includes the following steps:

i) arranging the first abutment means 400 onto the shaft 300;

ii) arranging the first sealing element 140, and the first carrier means 110 and the second carrier means 120, over the shaft 300;

iii) arranging the second abutment means 600 onto the shaft 300;

iv) fastening the sealing means 100 in the mechanical device 10, by compressing the second abutment means 600 towards the first abutment means 400, thus compressing the first sealing element 140 in the first direction A, axially along the shaft 300, and expanding the first sealing element in the second direction B, radially towards the shaft, thus bringing a first sealing surface 180 of the first sealing element 140 in sealing engagement with the first abutment means 400 and a second sealing surface 190 of the first sealing element 140 in sealing engagement with the shaft 300; and v) fastening the second abutment means 600 on the shaft 300;

A second method of mounting the sealing device 100 in a mechanical device 10 according to the invention includes the following steps:

i) arranging the first abutment means 400 onto the shaft 300;

ii) arranging the first carrier part 110 onto the shaft 300;

iii) arranging the second carrier part 120 on the first carrier part 110;

iv) arranging the second abutment means 600 onto the shaft 300;

v) fastening the sealing means 100 in the mechanical device 10, by compressing the second abutment means 600 towards the first abutment means 400, thus compressing the first sealing element 140 in the first direction A, axially along the shaft 300, and expanding the first sealing element in the second direction B, radially towards the shaft, thus bringing a first sealing surface 180 of the first sealing element 140 in sealing engagement with the first abutment means 400 and a second sealing surface 190 of the first sealing element 140 in sealing engagement with the shaft 300; and vi) fastening the second abutment means 600 on the shaft 300.

The sealing elements may be fastened to the respective carrier part by crimping or bonding. The carrier parts are usually made of steel, e.g. steel stampings, but may be aluminium, brass or the like. Suitable materials for the sealing elements are rubbers, e.g. nitrile rubbers, natural rubbers, fluorelastomers, carboxylated nitrites, hydrin rubbers, silicone rubbers etc. For harder sealing material, a fluorocarbon resin may be used, e.g. a polymer of tetrafluoroethylene filled with glass fibres, carbon or other materials.

The invention is neither limited to the description above nor to the examples shown on the drawings, but may be varied within the scope of the appended claims. For example, an arrangement where an additional expanding sealing element is arranged to seal against the housing, in addition to the expanding sealing means sealing against the shaft, is also possible using the sealing device according to the invention. An additional enclosure means will then have to be furnished for the additional expanding sealing element, co-operating with an additional abutment means arranged to act as a stop for the additional expanding sealing element. The sealing device may comprise a one-part carrier means as opposed to the two-part embodiment shown in the Figures.

What is claimed is:

1. A mechanical device, comprising:
   a shaft;
   a sealing device for sealing around the shaft;
   a housing; and
   a first abutment means, wherein the sealing device comprises carrier means on which a plurality of sealing elements are arranged, and wherein the mechanical device further comprises an enclosure means and the sealing device further comprises a first sealing element having an inner dimension which is larger than an outer dimension of the shaft, wherein the enclosure means at least partially encloses the first sealing element, so that, after the first sealing element has been mounted and compressingly fastened in the mechanical device, the first sealing element is compressed in a first direction (A) axially along the shaft and expanded in a second direction (B) radially towards the shaft so that a first contact surface of the first sealing element is in contact with the first abutment means and a second contact surface of the first sealing element is in sealing engagement with the shaft.

2. The mechanical device according to claim 1, wherein the enclosure means is arranged on the carrier means.

3. The mechanical device according to claim 1, wherein the enclosure means is arranged on the first abutment means.

4. The mechanical device as in claim 1, wherein the carrier means comprises a first carrier part and a second carrier part, wherein the first carrier part carries the first sealing element which is arranged to seal against the shaft, and the second carrier part carries i) a second sealing element which is arranged to seal against the housing, and ii) a third sealing element which is arranged to seal between the first carrier part and the second carrier part.

5. The mechanical device according to claim 4, wherein the first carrier part is arranged to rotate with the shaft and the second carrier part is arranged to be fixed with respect to the housing.

6. A method of mounting a sealing device in the mechanical device recited in claim 4, including the steps of:
   i) arranging the first abutment means on the shaft,
   ii) arranging the first sealing element and the first carrier part and the second carrier part over the shaft,
   iii) arranging a second abutment means onto the shaft,
   iv) fastening the sealing device in the mechanical device by compressing the second abutment means towards the first abutment means, thus compressing the first sealing element in the first direction (A) axially along the shaft, and expanding the first sealing element in the second direction (B) radially towards the shaft, thus bringing a first contact surface of the first sealing element in contact with the first abutment means and a second contact surface of the first sealing element in sealing engagement with the shaft, and
   v) fastening the second abutment means on the shaft.

7. A method of mounting a sealing device in the mechanical device recited in claim 4, comprising the steps of:
   i) arranging the first abutment means onto the shaft,
   ii) arranging the first carrier part onto the shaft,
   iii) arranging the second carrier part on the first carrier part,
   iv) arranging a second abutment means onto the shaft,
   v) fastening the sealing means in the mechanical device by compressing the second abutment means towards the first abutment means, thus compressing the first sealing element in the first direction (A) axially along the shaft and expanding the first sealing element in the second direction (B) radially towards the shaft, thus bringing a first contact surface of the first sealing element in contact with the first abutment means and a second contact surface of the first sealing element in sealing engagement with the shaft, and
   vi) fastening the second abutment means on the shaft.

8. The mechanical device according to claim 1, wherein the first abutment means is a bearing.

9. The mechanical device according to claim 1, wherein the first abutment means is an enlarged diameter part of the shaft.

10. A mechanical device, comprising:
    a shaft rotatable around an axis;
    a sealing device for sealing around the shaft, said sealing device including a carrier surrounding the shaft on which a plurality of annular sealing elements are arranged, a first of the sealing elements having an inner dimension which is larger than the outer dimension of the shaft;
    a housing spaced apart from the shaft, wherein the shaft is rotatable relative to the housing;
    a first annular abutment surrounding the shaft against one axial end of the sealing device;
    a second annular abutment surrounding the shaft against another axial end of the sealing device; and
    an annular enclosure at least partially enclosing the first sealing element, the first sealing element being compressed between the first and second abutments in a first direction (A) axially along the shaft and expanded in a second direction (B) radially towards the shaft, so that a first contact surface of the first sealing element is in contact with the first abutment and a second contact surface of the first sealing element is in sealing engagement with the shaft.

11. The mechanical device according to claim 10, wherein the enclosure is unitary with the carrier.

12. The mechanical device as in claim 10, wherein the carrier comprises a first carrier part and a second carrier part, wherein the first carrier part carries the first sealing element which is arranged to seal against the shaft, and the second carrier part carries i) a second sealing element which is arranged to seal against the housing, and ii) a third sealing element which is arranged to seal between the first carrier part and the second carrier part.

13. The mechanical device according to claim 12, wherein the first carrier part is fixed to and rotatable with the shaft and the second carrier part is fixed with respect to the housing.

14. The mechanical device according to claim 10, wherein the first abutment is a bearing.

15. The mechanical device according to claim 10, wherein the first abutment is an enlarged diameter part of the shaft.

16. A method of mounting a sealing device in a mechanical device, wherein the mechanical device includes a shaft rotatable around an axis; and the sealing device includes a carrier surrounding the shaft on which a plurality of annular sealing elements are arranged, a first of the sealing elements having an inner dimension which is normally larger than the outer dimension of the shaft; a housing spaced apart from the shaft, wherein the shaft is rotatable relative to the housing; a first annular abutment surrounding the shaft against one axial end of the sealing device; a second annular abutment surrounding the shaft against another axial end of the sealing device; and an annular enclosure at least partially enclosing the first sealing element, comprising the steps of:

i) arranging the first abutment on the shaft, ii) arranging the carrier and the first sealing element over the shaft, v) arranging the second abutment onto the shaft, vi) fastening the sealing device in the mechanical device by compressing the second abutment towards the first abutment, thus compressing the first sealing element in the first direction (A) axially along the shaft and expanding the first sealing element in the second direction (B) radially towards the shaft, thus bringing a first contact surface of the first sealing element in contact with the first abutment means and a second contact surface of the first sealing element in sealing engagement with the shaft, and v) fastening the second abutment on the shaft.

17. A method of mounting a sealing device in a mechanical device, wherein the mechanical device includes a shaft rotatable around an axis; and the sealing device includes a carrier surrounding the shaft on which a plurality of annular sealing elements are arranged, a first of the sealing elements carried by a first carrier part and having an inner dimension which is normally larger than the outer dimension of the shaft, and a second sealing element carried by a second carrier part; a housing spaced apart from the shaft, wherein the shaft is rotatable relative to the housing; a first annular abutment surrounding the shaft against one axial end of the sealing device; a second annular abutment surrounding the shaft against another axial end of the sealing device; and an annular enclosure at least partially enclosing the first sealing element, comprising the steps of:

i) arranging the first abutment onto the shaft, ii) arranging the first carrier part onto the shaft, iii) arranging the second carrier part on the first carrier part, iv) arranging the second abutment onto the shaft, v) fastening the sealing device in the mechanical device by compressing the second abutment towards the first abutment, thus compressing the first sealing element in the first direction (A) axially along the shaft and expanding the first sealing element in the second direction (B) radially towards the shaft, thus bringing a first contact surface of the first sealing element in contact with the first abutment and a second contact surface of the first sealing element in sealing engagement with the shaft, and vi) fastening the second abutment on the shaft.

* * * * *